(12) United States Patent
Feinberg

(10) Patent No.: US 10,915,240 B2
(45) Date of Patent: Feb. 9, 2021

(54) METHOD OF SELECTION AND MANIPULATION OF GRAPHICAL OBJECTS

(71) Applicant: Alight Creative, Inc., Seoul (KR)

(72) Inventor: Matthew Aaron Feinberg, Seoul (KR)

(73) Assignee: Alight Creative, Inc.

( * ) Notice: Subject to any disclaimer, the term of this patent is extended or adjusted under 35 U.S.C. 154(b) by 0 days.

(21) Appl. No.: 16/418,098

(22) Filed: May 21, 2019

(65) Prior Publication Data

US 2019/0354279 A1 Nov. 21, 2019

Related U.S. Application Data

(60) Provisional application No. 62/674,174, filed on May 21, 2018.

(51) Int. Cl.
*G06F 3/0482* (2013.01)
*G06F 3/0485* (2013.01)
*G06F 3/0488* (2013.01)

(52) U.S. Cl.
CPC ........ *G06F 3/04855* (2013.01); *G06F 3/0482* (2013.01); *G06F 3/04883* (2013.01)

(58) Field of Classification Search
CPC ........ G06F 3/041; G06F 3/048; G06F 3/0482; G06F 3/0484; G06F 3/0485; G06F 3/0488
See application file for complete search history.

(56) References Cited

U.S. PATENT DOCUMENTS

| | | | | |
|---|---|---|---|---|
| 4,568,810 A * | 2/1986 | Carmean | .............. | H05B 6/6452 219/702 |
| 8,004,496 B2 * | 8/2011 | van Os | ................. | G06F 3/0482 178/18.01 |
| 8,350,807 B2 * | 1/2013 | Park | ...................... | G06F 3/0485 345/156 |
| 8,875,044 B2 * | 10/2014 | Ozawa | ................ | G06F 3/04845 345/173 |
| 9,189,142 B2 * | 11/2015 | Kim | ........................ | G06F 3/044 |
| 9,785,331 B2 * | 10/2017 | Telang | .................. | G06F 3/0485 |
| 2007/0075984 A1 * | 4/2007 | Chiu | .................... | G06F 3/04886 345/173 |
| 2008/0174567 A1 * | 7/2008 | Woolley | ................ | G06F 3/0485 345/173 |
| 2010/0110034 A1 * | 5/2010 | Teng | ..................... | G06F 3/0485 345/173 |
| 2011/0122159 A1 * | 5/2011 | Bergsten | ............. | G06F 3/04886 345/684 |
| 2011/0302534 A1 * | 12/2011 | Ooguchi | ............. | G06F 3/04883 715/830 |
| 2012/0174026 A1 * | 7/2012 | Shim | ..................... | G06F 3/0485 715/784 |
| 2019/0278393 A1 * | 9/2019 | Lee | ..................... | G06F 3/04886 |
| 2019/0332236 A1 * | 10/2019 | Zadesky | ................. | G06F 3/038 |

* cited by examiner

*Primary Examiner* — Xiomara L Bautista
(74) *Attorney, Agent, or Firm* — Park & Associates IP Law, P.C.

(57) ABSTRACT

A method, apparatus, system, and computer program product/article of manufacture provide the ability to enable and use of a Control Pad technology on a multi-touch device, which is designed for a touch-based user interface that affords precise selection and manipulation of graphical objects, for instance, the editing of vector graphics objects, points on a vector object outline, animation paths, and positions of graphical objects within a document or composition.

17 Claims, 14 Drawing Sheets

METHOD OF SELECTION AND MANIPULATION OF GRAPHICAL OBJECTS

REFERENCE TO RELATED APPLICATIONS

This application claims the priority benefit of U.S. Provisional Patent Application No. 62/674,174, filed on May 21, 2018 in the U.S. Patent and Trademark Office, the entire contents of which are incorporated herein by reference.

FIELD OF THE INVENTION

The present invention relates to a system and method for selecting objects displayed on a touch screen, and more particularly to facilitating manual selection and manipulation of a selectable element of a graphical/animation object on a small touch screen by a user.

BACKGROUND OF THE INVENTION

Mobile devices such as smartphones and tablets are becoming increasingly more capable. As mobile computing performance and feature sets improve, increasingly more use cases are moving from traditional desktop or laptop computing platforms to mobile platforms. For example, event scheduling and time management are some of the natural use cases that have moved to mobile platform, not to mention social media engagement, which occurs predominantly on mobile devices. Mobile device performance has reached the point where professional use-cases are beginning to emerge, such as productivity suites like word processors, spread sheets, and slide presentation tools, as well as complex video editors.

However, mobile user interfaces present certain challenges that don't exist in a desktop or laptop environment. In particular, mobile devices lack a mouse or keyboard, and interaction is typically via a touch interface. Unlike a mouse cursor used in a desktop environment, which is very precise, a control made with human finger on a touch screen of a mobile device is much less accurate. In addition, with a mouse, user interface objects may be designed in small sizes for various reasons (e.g., to provide more screen/display real estate such that more information can be displayed in a single view). Clickable regions for a mouse can be as small as 2.5 mm without causing any inconvenience. Conversely, on mobile devices the minimum recommended touch area size is around 7 to 10 mm. The size of fingers (or fingertips) may make it challenging to accurately select user interface objects that are designed and sized for different user interface methods (e.g., traditional mouse-based inputs).

Further complications arise because a touch interface typically involves direct interaction with user interface elements, meaning the user's finger likely obscures the element being interacted with, making precise selection or editing difficult.

The traditional approach in solving the foregoing problem for mobile applications was to simplify the user interface design at the expense of giving up some of the functionalities of its desktop or laptop counterparts. A simplified feature set translates to less options to present to the user, which allows for larger touch interactive areas. In some cases, user interaction features such as a pinch gesture for zoom are used to temporarily scale the user interface to enhance the user interaction on mobile applications.

However, these traditional approaches don't lend themselves well enough when precise selection or control is necessary. For precise operations, there are two major traditional approaches which address only very specific use cases and have inherent limitations.

The first approach is typical on iPhone® (from Apple Inc. of Cupertino, Calif.) when watching video. To seek or scrub to another point in the video, the user drags her finger left or right (that is, along the x-axis) on a seek bar. However, for a video with a long playtime, a single pixel of finger movement can translate to several seconds in that video. Sometimes, an application is configured so that vertical drag on the screen, perpendicular to the normal axis of movement for seeking, is used to enable half-speed or quarter-speed scrubbing, allowing more precise seek control functionality in the application. This approach works very well when a limited number of functionalities is involved (in this case, time seek). Since y-axis drag is repurposed to control scrubbing speed, y-axis drag is unavailable for other use.

Another common mobile user interface feature is used in the context of text selection, providing a way for the user to see the text they are selecting without obscuring it with their finger. On iOS®, this is done by providing a magnified view of the area under the finger in a separate view. In Android™ OS, this is done by providing handles below the text selection which can be dragged by the user, allowing the start and end of the selection to be moved without obscuring the screen.

The foregoing approaches suffer from the same fundamental problem; the rate of movement is still a 1:1 mapping between pixels moved by the finger and pixels moved on the screen. In this setting, pixel-accurate selection is extremely difficult and time consuming. Although text selection may not require pixel-accurate control, but text characters are still quite small on the screen (as small as 1 mm), often resulting in inaccurate selection of texts on mobile devices.

These existing technologies are suitable for their specific use-cases, but they do not provide sufficient accuracy or controllability for editing general visual content such as vector graphics, page layouts, animations, and etc. on mobile application environment.

Thus, it would be desirable to have a comprehensive framework or mechanism for user to quickly perform precise pixel-accurate selection and manipulation of graphical elements using a touch interface without scarifying features or functionalities of the application.

SUMMARY OF THE INVENTION

This disclosure introduces a Control Pad technology designed for a touch-based user interface that affords precise selection and manipulation of graphical objects, for instance, the editing of vector graphics objects, points on a vector object outline, animation paths, and positions of graphical objects within a document or composition.

This Control Pad technology is realized by several components, including:

a Control Pad area for receiving a user's gestures that represent certain control commands relating to selection and/or manipulation (such as by changing location and scale) of graphical objects or components of those graphical objects such as control points (outline control points, Bezier curve control points, lines, motion paths, and pivot points (collectively referred to as elements), as well as a variety of parameters/attributes of such elements, displayed in an area separate from the Control Pad area or otherwise provided discretely to avoid the user's finger obscuring the view while selecting and manipulating the object or elements of the object on in the work area or document;

enhancements to the control mechanism for selection/manipulation of the graphical object and its elements, such as motion-absorbent snapping and gesture acceleration to adjust the mapping between finger motion and element motion in order to enable fast, precise selection and manipulation of elements in the work area or document;

associated user interface controls to allow fast and efficient pixel-precise scaling of elements;

associated user interface controls to allow fast and precise selection of control points on an object outline, including objects defined by Bezier curves with additional Bezier control points; and additional information displayed within the Control Pad interface to aid the user in precise positioning of elements.

Other features of the Control Pad technology includes, 1) direct manipulation Control Pad, where the selected element is controlled/manipulated directly rather than through an intermediate graphical controlling tool such as a cursor, 2) gesture acceleration, 3) motion-absorbent snapping, 4) linear scrollable view tool, which can show the linear representation of selectable elements that incorporates relative direction/distance between the selectable elements along transverse axis; allowing easier addition of a new points between pre-existing points and manipulation with Bezier control handles, 5) momentum control enabled spinner for pixel-precise scaling, which can be provided in an axis constrained mode or axis un-constrained mode.

The foregoing and other features can be used in improving precise selection of objects presented on touch interactive user interface. In one aspect, the present disclosure is related to a method of selecting a controllable element represented on a touch screen display. In a touch interactive user interface, one or more object may be displayed. Non-limiting examples of the selectable objects include texts, shapes, image, icon and more. A scalable box for placing any one of the selectable object (e.g., texts, shapes, image, icon) may itself be a selectable object. Each graphical object may be associated with a plurality of selectable elements, including but not limited to, outline control points, Bezier curve control points, lines, motion paths, pivot points or other types of control points that are specifically tied to a respective object.

When a graphical object is selected, a linear-scrollable view tool may be activated to show a group of selectable elements associated to the selected graphical objects are presented. In one embodiment, the linear-scrollable view tool includes a region for showing a group of selectable elements of the selected graphical object in a linearly arranged fashion. The group of selectable elements may be a group of outline control points, a group of Bezier curve control points, a group of lines, a group of motion paths, a group of pivot points or a group of other specific control points that are specifically tied to that selected object. When showing the group of selectable elements, they may be arranged in certain logical order, for instance, based on their placement within the selected object or based on the size/length of the elements and more. The linear-scrollable view tool is responsive to a user's gesture control, allowing the user to scroll through the selectable elements shown in a linearly ordered fashion and make a desired selection among those selectable elements. In this way, the user is allowed to navigate through a list of selectable elements, which is presented in a logical order, and precisely select a desired element without having to pinch to zoom in to see the scaled section of the object or having to touch the element obscured from the view by the user's finger, hoping that touch input will select the intended element.

In some embodiments, the selectable elements are linearly arranged based on the connectivity among the selectable elements. For instance, two outline control points linked via a line in a given selected object may be ordered one after another in the linear arrangement shown in the linear-scrollable view tool. In some embodiments, the linear scrollable view tool is configured to represent each element's relative position, distance, vector or other parameters in reference to other elements of the group of elements being shown in linear order.

In another aspect, the present disclosure is directed to a method of manipulating a selectable element presented on a touch screen display. Once an element of a graphical object is selected, it may be manipulated by the user's touch input. For instance, the position of the selected element may be changed or the size of the selected element may be changed by user's touch input (e.g., drag gesture). When manipulating the element, it may "snap" to another element, meaning the element being manipulated is pulled towards another element so that at least one part of those two elements has the same coordinate. Usually, the snapping of the elements is triggered based on the distance between stationary element and the element being moved or resized by user control. Once the elements are snapped, they would stay snapped even though the user input for resizing or moving the element continues until a predetermined threshold amount (e.g., pixel distance or different in size). In other words, the change in position or size that would have occurred by the user input is absorbed by the predetermined threshold amount. The user's input would actually detach the snapped element and start to move or resize the element, when the change in the position or the size goes beyond the predetermined threshold amount. The change in the position or the size that was absorbed by the predetermined threshold amount is only used for maintaining the snap, but would not be applied in positioning or resizing of the element when the element is released from the snap. In this way, a precise pixel scale manipulation of the element is allowed in conjunction with the snap feature.

In some embodiments, a different threshold amount may be set for different direction or for different action. For example, the threshold amount for releasing the element from snap may be smaller for the user input that results in moving or resizing the element back towards its originating position or back towards the original size than for the user input that results in moving or resizing the element away from its originating position or the original size.

In one aspect, the present disclosure relates to a graphical user interface on a computing device with a touch display adapted to detect user gestures, a memory, and one or more processors to execute one or more programs stored in the memory. The graphical user interface includes a user interface including at least one user interface element configured to show a group of selectable elements associated with a selected graphical object, in which the group of selectable elements are presented in a linearly ordered fashion adapted for scroll navigation and selection. The graphical user interface includes a user interface configured to move, or otherwise manipulate, a selected object or element in response to user gestures, wherein, when the selected object or the element snaps to another object or another element, a change in position or a change in size of the selected object or element exerted by the user gesture is ignored for a predetermined threshold amount.

Thus, the graphical user interfaces disclosed herein are provided with faster, more precise and efficient methods and interfaces for managing user interface objects and user interface elements, including use of a linear-scrollable view tool that is configured for selecting intractable elements, and configured for smooth release from snap behavior during user interface element manipulation such as movement and resize. These graphical user interface with faster, more efficient methods and interfaces increase user effectiveness, efficiency, accuracy and satisfaction. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE INVENTION

Figure 1:
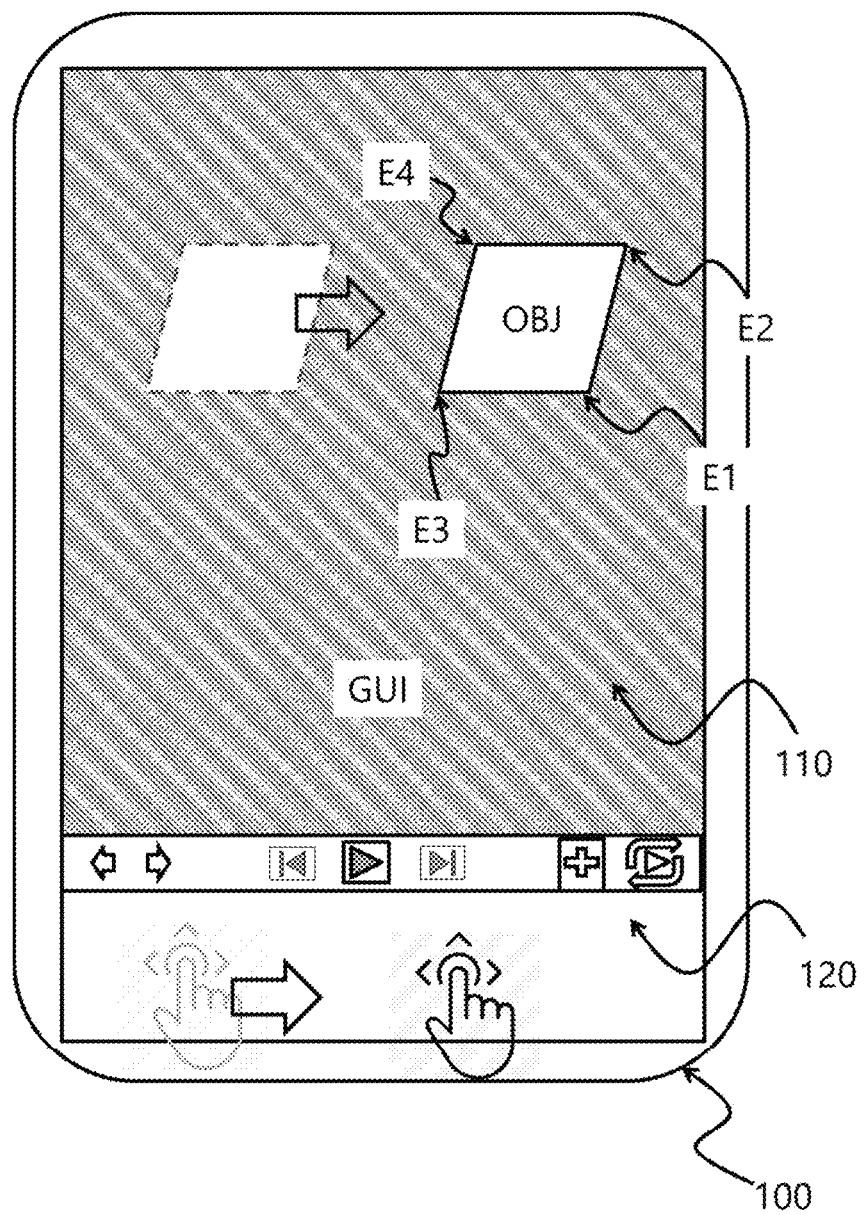
FIG. 1 is a block diagram illustrating mobile devices with touch-sensitive display provided with a Control Pad in accordance with some embodiments, FIG. 2 illustrate exemplary user interfaces for direct manipulation of an object using the Control Pad in accordance with some embodiments.

Hereinafter, the present invention will be described in more detail with reference to the following Examples. However, these Examples are set forth to illustrate the present invention, and the scope of the present invention is not limited thereto.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Typical mobile user interface allows a user to move an object by touching the object directly with their finger and dragging it. However, the object being interacted with is often obscured from the view by the user's finger. Therefore, it is virtually impossible to control the object by the conventional touch interaction.

FIG. 1 illustrates an exemplary embodiment of a graphical user interface (GUI) of a mobile device 100, which includes a composition region 110 for illustrating object OBJ and a dedicated Control Pad region 120 for handling user's touch gesture is provided separately from the composition region 110. The Control Pad region 120 is dedicated for presenting the tools and for handling user touch gesture input. For devices with multiple screens (e.g., divided screen or multiple display panels), the composition region 110 and the Control Pad region 120 may be provided on the same screen or on different screens of the same device.

The graphical user interface GUI provided with direct manipulation Control Pad 120 of the present disclosure allows the user to adjust position; scale; deform shape or otherwise manipulate a visual object OBJ (e.g., box, circle, image, icon, shape) or an element of said visual object (such as a point on the object's outline; a selected group of such points, or the pivot point of the object). In the present disclosure, a part of the object being manipulated may be referred to as an element (E1~E6), The element is typically a part of a graphical object depicted in a document such as a visual composition, animation, presentation, or scene, Among the objects displayed in the GUI, selectable objects and non-selectable object may be indicated accordingly. It should be noted that objects may become selectable or non-selectable, depending on the stage of operations or based on the layer that the user is working on. For instance, only those objects included in the same layer may be indicated as selectable. Likewise, turning on certain function may make only those objects relevant or otherwise compatible to that function become available for selection, Of course, selecting different layers or disabling the selected function will alter which graphical objects become selectable or non-selectable.

Here; the selection of the object OBJ can be made by simply touching the object OBJ on the screen or by using the linear-scrollable view tool, which will be described in detail below. The Control Pad region 120 provided in the present disclosure is different from traditional trackpad or cursor oriented mouse. Unlike a mouse or trackpad, the Control Pad of the present disclosure does not rely on a cursor, but rather manipulates the selected component directly. That is, any input provided in the Control Pad region 120 is directly applied to the selected object or the selected element. In FIG. 1, the selected object OBJ is repositioned as the user's touch input is made on the Control Pad region 120 from left to right. Touch gestures applied in the Control Pad region 120 directly moves x and y coordinates of the selected object or element by a number of pixels proportional to the amount the user's finger has moved in the Control Pad region 120. Here, the proportion of the positional change of the selected component (i.e., object and/or element) to the distance (number of pixels) the user's finger has moved in the Control Pad region 120 may be 1:1, or multiplied by a predetermined scaling factor. The scaling factor may be adjusted manually and/or automatically based on various factors such as the dimension of the Control Pad region 120, the ratio of Control Pad region size and the size of the selected component, size of the touch area, or based on how the gesture was entered (e.g., by using finger or using pen), or any combination of the foregoing.

When a cursor is used, the user must be able to indicate in some manner that she intends to move only the cursor or if she intends to select or interact with the object that the cursor is pointing to. This is typically done by pressing and holding a button on a mouse, or using a click action on a trackpad. A smartphone does not have a physical button that can be used this way, and in a smartphone form factor, using a virtual button to mimic the mouse holding mechanism is impractical due to limited screen space. Some devices are offered with force touch feature, allowing for multiple commands based on the touch pressure on the screen. Force-touch with two fingers (one finger for click and drag with two fingers) offer even more commends, but such method is also impractical because of the limited space on the screen. Further, precise control is difficult with such force touch mechanism due to limited human motor accuracy in applying the correct amount of force required for the intended force touch gesture.

Conversely, manipulating the object directly (rather than using a cursor) greatly expands the room for improving user interface features. For instance, the motion-absorbent snapping feature, which will be described in detail below, cannot be implemented in a typical cursor control based user interface environment, because the cursor is typically under the control of the operating system at a lower level, and not accessible for the application to control the cursor location. Further, the cursor needs to be positioned somewhere within the then-current displayed region of the composition region 110. To move the cursor out of the then-current displayed view of the document will require the a visual composition, presentation or the scene to be scaled down to show both the graphical objects of the documents as well as the cursor on the same screen. In other words, the graphical user interface must always consider the location of the cursor as well as the location of the object. If an object can be interacted and/or manipulated directly without a cursor, however, dragging after a selection or scrolling is no longer limited by the size of the displayed region at a given time.

In some embodiments of the Control Pad region, it may be used to show information about the selected element and the interaction being made directly inside the Control Pad region 120. For example, X and Y coordinate information, distance moved of the selected element may be presented in the Control Pad region 120.

In some embodiments, the Control Pad with the direct manipulation feature described above may also be provided with a gesture acceleration feature. In other words, a scaling factors can be used when converting the touch input made in the Control Pad region to the manipulation of the object in the composition region for pixel-precise manipulation.

Conventional smartphone scrolling maps pixels traveled by the finger 1:1 with pixel distance scrolled in the application. Even fling gestures map the final finger velocity 1:1 with the pixel velocity of the fling. In traditional graphical user interface, only the coefficient of friction (which causes the fling to slow down and eventually stop) is customizable. However, when using the Control Pad of the present disclosure, a mapping other than 1:1 ratio is possible, which allows the user more control. For example, if the element being manipulated moved 2 pixels for every 1 pixel of finger motion (2:1), the object can be moved quickly and reach distant areas of the composition region. If the element moves 1 pixel for every 2 pixels of finger motion (1:2) the user can make fine adjustments more easily. In some embodiments, the ratio can be dynamically adjusted based on speed of the user's finger movement. For instance, the composition region:control region ratio can be increasingly set high as the traveling speed of user's touch input in the Control Pad region 120 increases. Of course, the composition region:control region ratio can be decremented as the traveling speed of the user's touch input in the Control Pad region 120 slows down. In some embodiments, the ratio can be dynamically adjusted based on the number of repetition of the user's touch input in the same (or similar) direction. If the user drags his finger left to right for multiple times, the composition region control region ratio can be increased until the user no longer makes the input. By dynamically adjusting this ratio based on the speed of the user's finger movement (this is gesture acceleration), it is possible to provide the user with more control.

The gesture acceleration described above may look similar to the mouse cursor ballistics on the PC, but it works very differently with a different acceleration algorithm. In the typical PC environment, the input mechanism must be able to move independently of the graphical representation (the mouse cursor on a PC, or the element being manipulated in the present invention). With a mouse or trackpad, motion is reported in higher-resolution units (commonly called mickeys) which are then processed by the operating system and converted to pixel coordinates. The only case where this doesn't happen is when using a stylus with absolute position (such as a drawing pad device) but those devices don't implement acceleration, and thus they are typically used in combination with a relative pointing device with acceleration, such as a mouse.

On a touch screen, the touch location has already been translated into pixel coordinates by the operating system, which means much of the original velocity data has been discarded. Accordingly, the Control Pad of the present disclosure use a dampening algorithm described below (essentially, a weighted average of past pixel coordinates) to recover an approximation of the actual finger velocity data that has been discarded during the conversion to pixel coordinates. Because the graphical user interface 110 with Control Pad 120 continuously map the whole range for gesture speeds from slow (less than 10 pixels per second) to fast (hundreds or thousands of pixels per second) the graphical user interface 110 needs to recover a good approximation of the original velocity without integer rounding errors. As described below, this is necessary to avoid sudden jumps in speed when the user is moving their finger slowly.

Figure 2:
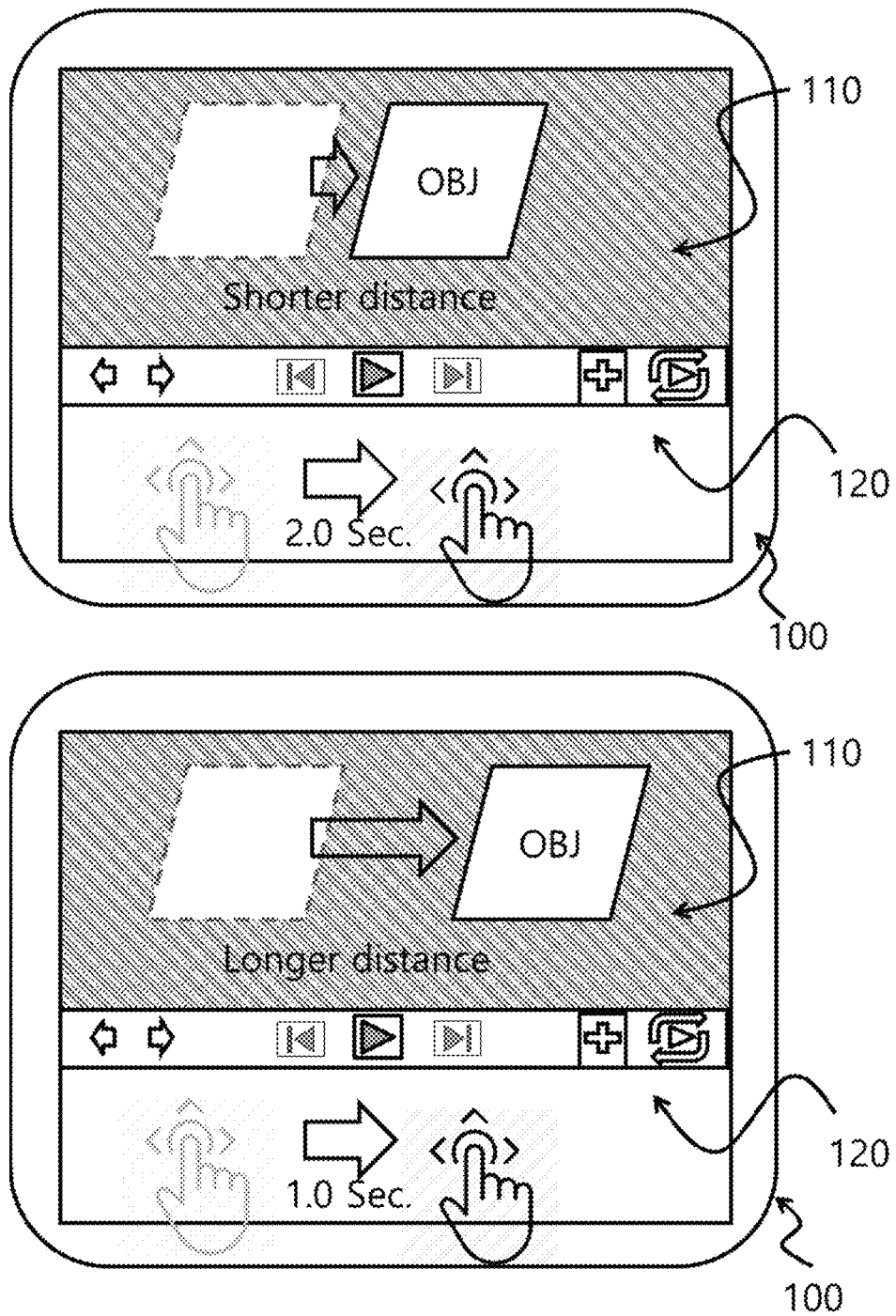

As shown in FIG. 2, the adjustable or dynamic scaling factor of the Control Pad described above, may be adjusted based on the speed with which the user's finger(s) (or other touch input object(s)) move in the Control Pad region 120. Thus, slow gestures can be used for fine positioning of the object OBJ, while fast gestures can be used to move the object OBJ to distant coordinates more rapidly.

The gesture acceleration on touch screen device may look similar to the traditional mouse pointer acceleration (also known as mouse pointer ballistics), which increases the distance of motion of a mouse cursor on the screen based on the speed of motion of the mouse. Traditional approaches are implemented internally within the operating system and take the amount of X and Y mouse pointer motion reported during a given period of time over the system bus (or via USB or bluetooth). These units are unrelated to pixels on the screen. Expressed as a vector quantity, the length of the vector divided by elapsed time gives the speed of motion, which can then be used to calculate the acceleration factor. For example, let k be a vector quantity representing the number of mickeys of movement reported over the bus in a given time interval, and let dt be the length of that time interval, then $\|k\|/dt=u$ where u is the instantaneous velocity. Based on the instantaneous velocity, the actual pointer distance moved can be scaled.

Unlike traditional mouse movement, touch locations are reported by mobile operating systems based on integral pixel coordinates on the screen (the center point beneath the pixels touched by the finger). Contrast this to the case of a mouse cursor, where the raw mouse movement data (sometimes called mickeys) is received over the system bus and processed by the operating system before being translated into cursor location and integer pixel coordinates. This integer quantization means that finger motion is not reported "smoothly" but rather suffers from rounding errors. These rounding errors balance out over time, but cause problems with the instantaneous velocity calculation (instantaneous velocity here means the velocity calculated based on the difference between the location of a touch sample and the location of the immediately preceding sample), causing the element being manipulated to move in sudden uneven bursts of speed although the user is moving their finger slowly.

Applying a traditional mouse ballistics algorithm causes sudden jumps in the position of an element being manipulated because of sudden variations in computed velocity due to these integer rounding or quantization errors. For example, consider that the user's finger moved one quarter of a pixel when using the traditional mouse pointer ballistic algorithm. The reported change in position may be registered by the screen's touch sensors, but is not reported to the application. Only when the accumulated motion has passed half a pixel, it is reflected in the integral pixel coordinate, causing a sudden "jump". Essentially, this quantization of the reported position causes the calculated instantaneous velocity to sharply increase, then drop back to zero, whenever an integral pixel boundary is crossed. For large, fast gestures covering multiple pixels in a sampling interval, the error is proportionally small and may not be noticed by the user. However, when making slow gestures for fine adjustments, sudden spikes in calculated instantaneous velocity frequently occur.

This is solved in the Control Pad implementation by dampening the detected velocity. In one embodiment, given some contribution factor c in the open interval (0,1), and given an instantaneous velocity u the dampened velocity v at time t can be calculated as:

$$v_t = uc + v_{t-1}(1-c)$$

In an exemplary embodiment of a reference implementation, a value of c=0.35 is used to obtain acceptable results in a typical Android OS environment. However, it should be noted that the appropriate value of c for a given environment may vary depending on the sampling rate of the touch position (e.g., sampling interval of approximately 16 ms for the 60 hz screen refresh rate, approximately 32 ms@30 hz screen refresh rate, approximately 8 ms@120 hz screen refresh rate). Of course, some devices may have a variable touch input sampling rate, and thus the contribution factor c used in the velocity dampening algorithm described above may be dynamically adjusted in real-time to accommodate changes in hardware or system related parameters.

Once the dampened velocity v has been calculated, the Control Pad of the present disclosure calculates an acceleration factor $\alpha_t$. This acceleration factor is based on a reference velocity r where we want no acceleration-based scaling. The reference velocity value may be a predetermined value, which can be selected by usability testing; in this example, 150 dp/sec). An exponent x is applied to achieve a logarithmic motion scale, which can be used in providing more natural control for users. This gives an acceleration factor α as, $$a_t = \left(\frac{v_t}{r}\right)^x$$

The factor α should be coerced within a limited range to avoid inconveniently slow or fast movement.

In usability testing, we found that limiting the acceleration factor α within the closed interval [0.5, 2.5] provided a comfortable response for users when the dimensions of the document and the Control Pad region 120 were similar. For more extreme ratios (for example, if the screen is much larger than the Control Pad region 120) a limit such as [0.5, 3.0] or more may be necessary based on usability testing. Similarly, if extremely precise control is required, the lower end of the range may be reduced to 0.25 or less. Depending on the specific form factor and physical screen size, it may be necessary to fine-tune the upper or lower bound of this range.

The acceleration factor is then used directly to scale the original motion vector. Therefore, given the reported finger position p the entire calculation is:

$$v_t = \frac{(p_t - p_{t-1})}{dt} c + v_{t-1}(1-c),$$

-continued $$a_t = \left(\frac{v_t}{r}\right)^x$$

$$m = a_t(p_t - p_{t-1})$$

Where m is the actual motion vector to be added to the current position of the element being manipulated.

Motion-Absorbent Snapping

On touch screen, aligning objects or elements of an object can be difficult. This is solved by using snap feature. On a PC environment using mouse cursor, snapping can be turned on or off by temporarily holding a hotkey while controlling the mouse, however such traditional snapping control methods don't work well in the touch screen environment.

Accordingly, the Control Pad technology of the present disclosure is provided with a motion absorbent snapping feature. When a selected component is being moved while the motion absorbent snapping feature is active, the position of the selected component "snaps" to the position of other components (e.g., other object or elements of the object) that acts as the alignment point or otherwise called snapping point, thereby assisting the user with fine positioning of the object/element. The motion absorbent snapping feature of the Control Pad technology is different from the conventional snapping feature in that the motion absorbent snapping is implemented by absorbing (or ignoring) a predetermined range manipulation by the touch input before starting to manipulate the selected component from the snapping point (e.g., detaching the selected component from the snapping point or releasing the selected component from the fixed size).

Figure 3A:
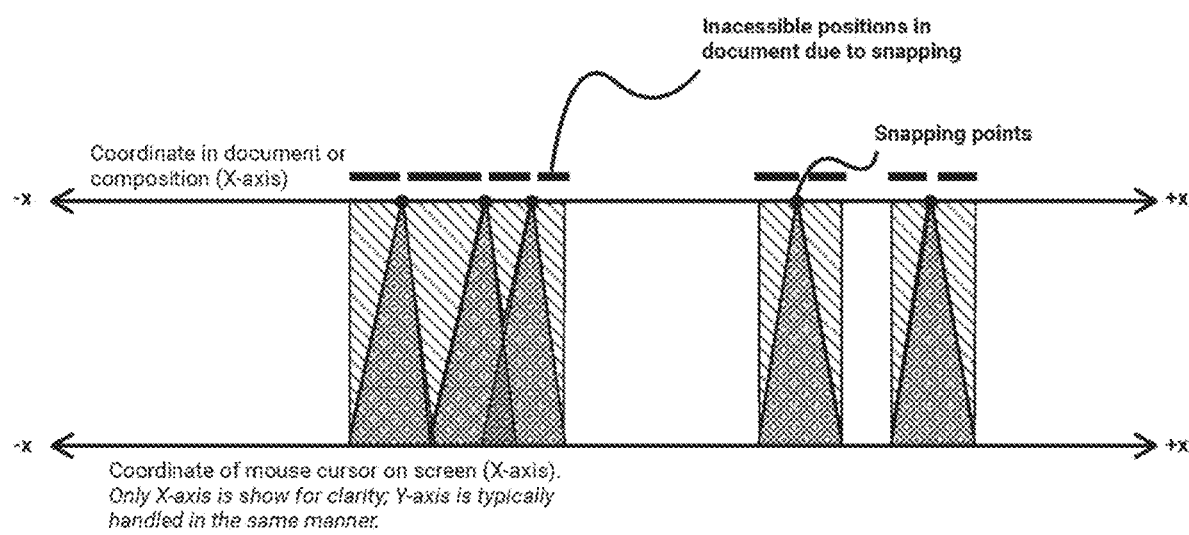
FIG. 3A illustrates a conventional snap function implemented on a user interface.

Unlike the motion absorbent snapping, with typical "snapping" methods, areas (i.e., predetermined ranges coordinates) near snapping points are not accessible. In other words, the interacted component snaps to a snapping point when the interacted component is moved into certain range of area surrounding the snapping point. FIG. 3 is a graphical illustration of the inaccessible areas created when using the conventional snapping mechanism. Because of the attraction by the snapping point, placing the selected component within the area surrounding the snapping point that triggers the snapping is impossible unless the snapping feature is disabled. This is traditionally solved by using a hotkey (such as SHIFT key) to temporarily disable snapping feature, but this approach requires a keyboard, which is not available on most smartphones. Further, the aforementioned problem of the conventional snapping feature becomes more problematic when there are many potential snapping candidates close to each other. Unlike the conventional snapping mechanism mentioned above, the motion absorbent snapping feature of the present disclosure makes all coordinates surrounding a snapping point accessible without having to manually disable the snapping feature.

Figure 3B:
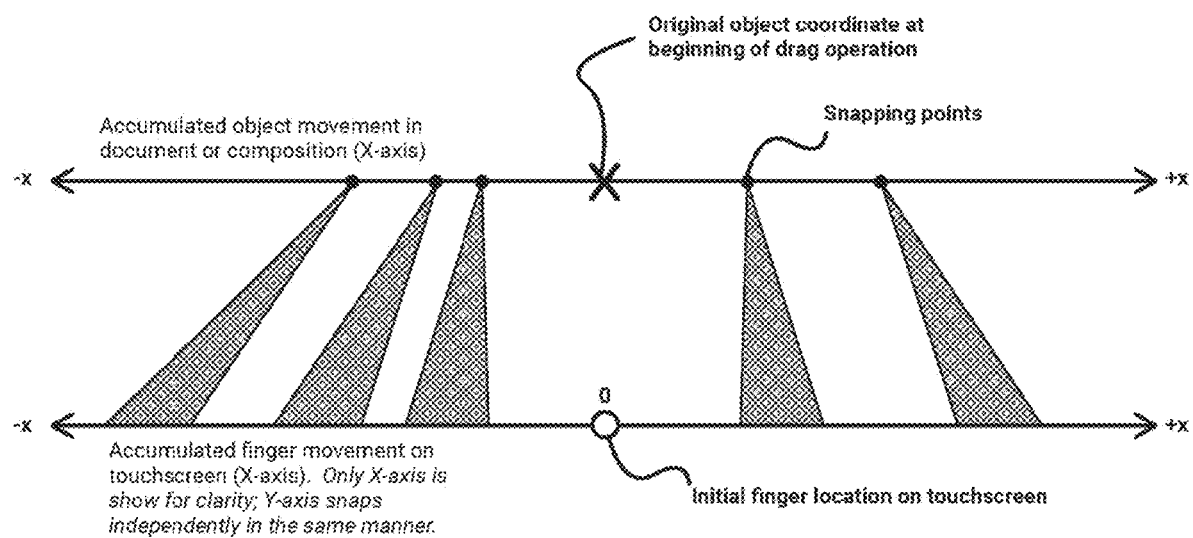
FIG. 3B illustrates an exemplary motion absorbent snap function implemented on the user interface in accordance with some embodiments.

Because the Control Pad doesn't control a cursor on screen, it is possible to halt the motion of the element being manipulated briefly even while the finger continues to move, then seamlessly resume motion after a certain amount of motion has been absorbed, without any sudden jump in the position of the element being manipulated. With a mouse cursor, this would not be possible because the mouse cursor would continue to move, moving out of alignment with the element being manipulated. Compare FIG. 3A which illustrates the conventional snapping mechanism, with FIG. 3B, which illustrates motion absorbent snapping of the present disclosure. As you can see in FIG. 3A, there are inaccessible areas along the x-axis. However, as shown in FIG. 3B, the motion absorbent snapping has allows to use all region along the pathway, effectively eliminating the inaccessible areas.

When the user's finger contacts the screen to begin a gesture, the Control Pad graphical user interface of the present disclosure builds a lookup table of distances from the touch point to each potential snapping point for each axis (i.e., one look-up table for x distances, one look-up table for y distances). These look-up tables are re-built every time the user begins a new gesture. These look-up tables map the accumulated relative distance moved by the user's finger from the beginning of the gesture to the actual distance that the element being manipulated will move.

The Control Pad use the distance the user's finger has moved from the initial touch coordinate, but rather than mapping the distance directly to pixels on the screen, the Control Pad split the accumulated motion distance into ranges of values and map ranges alternately to an offset range or a single pixel. For example, considering only the x-axis for purposes of explanation, imagine a user has touched a 1000-pixel-wide screen at x=500, and there are snapping candidates at x=400 and x=650. In this case, distance from the finger to the snapping points is −100 and +150, respectively, while the boundaries of the screen are at distances −500 and +500, respectively. Assuming the threshold amount for absorbing the input by 25 pixels of motion around each snapping point, this would result in the following mapping:

| Distance moved by touch-input (e.g., finger/pen) | | Distance Element will move | |
|---|---|---|---|
| −525 . . . −125 | → | −500 . . . −100 | (range-to-range mapping) |
| −125 . . . −100 | → | −100 | (range-to-pixel mapping; absorbing) |
| −100 . . . +150 | → | −100 . . . +150 | (range-to-range mapping) |
| +150 . . . +175 | → | +150 | (range-to-pixel mapping; absorbing) |
| +175 . . . +525 | → | +150 . . . +500 | (range-to-range mapping) |

As can be seen, all possible ranges are covered and no areas are inaccessible, and further the range of accumulated motion distance from −525 to +525 covers a total of 1050 pixels; that is, the 1000 pixels of the screen width plus 25 pixels for each potential snapping point along the x-axis.

For another example, considering only the y-axis, imagine the user has touched a 2000-pixel-high screen at y=0 (at the edge of the screen), and there are snapping candidates at y=500 and y=1000. In this case, distance from the finger to the snapping points is +500 and +1000, respectively, while the boundaries of the screen are at distances +0 and +2000, respectively. Assuming we want to absorb 100 pixels of motion around each snapping point, this would result in the following mapping:

| Distance moved by touch-input (e.g., finger/pen) | | Distance Element will move | |
|---|---|---|---|
| +0 . . . +500 | → | +0 . . . +500 | (range-to-range mapping) |
| +500 . . . +700 | → | +500 | (range-to-pixel mapping; absorbing) |
| +700 . . . +1200 | → | +500 . . . +1000 | (range-to-range mapping) |
| +1200 . . . +1400 | → | +1000 | (range-to-pixel mapping; absorbing) |
| +1400 . . . +2400 | → | +1000 . . . +2000 | (range-to-range mapping) |

As can be seen, all possible ranges are covered and no areas are inaccessible, and further the range of accumulated motion distance from +0 to +2400 covers a total of 2400 pixels worth of motion; that is, the 2000 pixels of the screen width plus 100 pixels on either side of each potential snapping point along the y-axis.

In the Control Pad graphical user interface of the present disclosure, the distance from the selected component to each snapping point, which serves as the threshold amount for absorbing the distance of movement, is calculated and a list of snapping distances are prepared for each axis (x and y) independently when the user initially touches the screen. The snapping distance with a pair of dragging distances are calculated for each snapping point; a near distance far distance. It should be noted that a near distance and a far distance is calculated for each snapping point for x axis and y axis. Accumulated motion distances between a given pair of near and far distances map to the single snapping distance, while distances before the near distance or after the far distance map to contiguous points between the snapping distances.

This approach cannot be implemented when using a trackpad or mouse for input, because trackpads and mice have an associated mouse cursor displayed on the screen. Because the application cannot control the location of the mouse cursor, the cursor continues to move on the screen, even when motion is absorbed by the snapping mechanism, causing the mouse cursor to gradually slide away from the object being positioned. However, with the motion absorbent snap approach of the Control Pad graphical user interface of the present disclosure, this is not an issue, because the object is directly manipulated and under the control of the application. The motion absorbent snapping feature simply cannot be implemented unless the application has the total control over the positioning of the mouse cursor.

When editing points on the outline of a vector shape, a mouse is typically used to select individual points for manipulation. However, on devices that use a touch screen rather than a mouse, it can be very difficult for a user to select the desired point if the shape is complex or if multiple selection points are positioned close to each other, because of the size of the area registered with a touch input may be too large to select unintended selection points. Also, the user's finger or the pointing device (e.g., pen) may obscure the point to be selected from the view.

Figure 4:
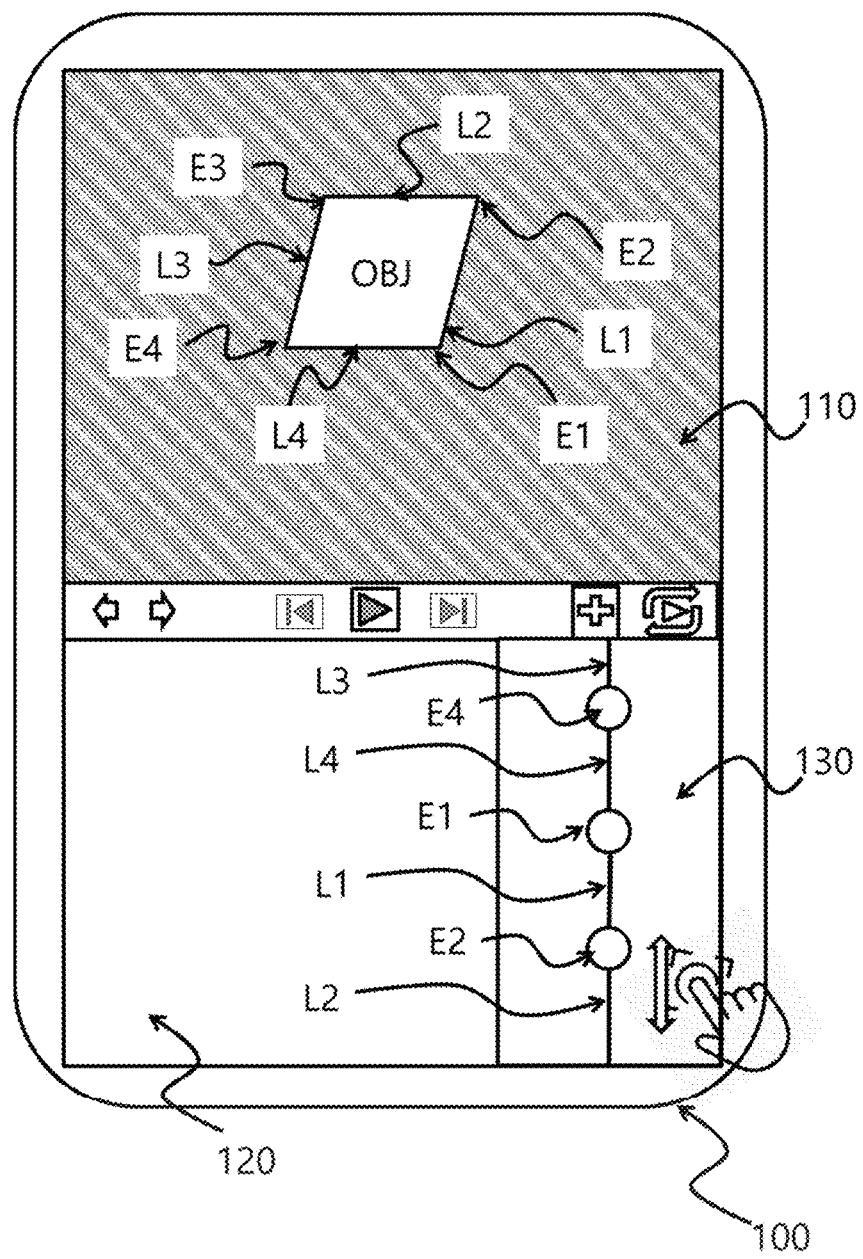
FIG. 4 is a block diagram illustrating a user interface provided with an exemplary linear scrollable view tool in accordance with some embodiments.

Accordingly, the Control Pad technology of the present disclosure provides a separate dedicated linear scrolling view of the object and its elements for simple and yet precise selection of those selectable elements. FIG. 4 illustrates an exemplary linear scrollable view tool 130, which shows a group of selectable points (E1~E4) and selectable lines (L1~L4) between every two selectable points of said group of selectable points, in a unwound and linearly arranged fashion. In this example, only the selectable element E1, E2 and E3 and the selectable lines L1, L2, L3 and L4 are represented in the linear scrollable view tool 130. Selectable element E3 is currently not shown in the linear scrollable view tool 130, but will be shown if the user scrolls up or down.

The selectable points to be included in said group may be all of the selectable points (E1~E4) of an object OBJ (for example, if the user touches the object to select the entire object), vertices of an object or even manually selected points of an object, e.g., a user may define a section area by drawing an enclosed shape over an object and all the selectable components within the selection area can be included in said group of components to be presented in the linear scrollable view tool. When manually selecting a group of selectable components to be presented in the linear scrolling view tool, selectable components that do not form a continuously linked loop (e.g., a continuous link of components where the ends are not joined to each other) may be presented as a singled closed loop of components in the scrollable tool view, with a dotted line, gap, or other alternate graphical representation indicating where the link of components has ended (scrolling past this point restarts at the opposite end as if it were a closed loop).

In FIG. 4, a group of selectable points includes E1, E2 and E3. A selectable line L1 is extended between the two selectable points E1 and E2, and a selectable line L2 is extended between the two selectable points E2 and E3. These elements are presented in a logical order as in the original object but in a linear fashion within a scrollable box area. Among the components presented in the linear scrollable tool view, the component that is currently selected may be distinguished (marked) from the unselected components. For instance, the selected component may be presented with a different color, different size, highlighted or denoted otherwise to differentiate them from the unselected components. The current point selected in the scroller is also indicated on the original object. When using the linear scrollable view tool, the centermost point (e.g., E1 in FIG. 4) is selected as default. Alternatively, the user can simply pick and touch the element from the linear scrollable view tool to select the designed element for further manipulation.

In an embodiment, the group of selectable components can rotate continuously as scroll gesture is registered in the Control Pad region 120 (or on the region where the linear scrollable view tool 130 is presented), and the component that is at the center of the linear scrollable tool view 130 can be automatically set as the selected component. This is particularly useful if the size of the linear scrollable view tool 130 within the screen is limited such that only a handful of selectable components among the group of selectable components are shown at a time in the linear scrollable view tool 130. In some other embodiments, the scroll gesture may shift the selection to the next selectable component in order rather than rotating the selectable components of the group. The selectable components will rotate when the shifting of the selection results in a selection of the component that is currently shown in the linear scrollable view tool 130. This is useful when relatively large linear scrollable view tool 130 is used or when large number of selectable components are being shown at a given time in the linear scrollable view tool 130. A user can also select a component among the group of selectable components shown in the linear scrollable view tool 130 by simply tapping an object.

For easier viewing and selection of the components, the size of the selectable points and the lines between those points as well as the distance between the selectable points (i.e., the length of the line between the two points) may be enlarged. The size of the selectable points and the distance between them can be scaled down or up. As such, the number of selectable points and lines within the limited size of the linear scrollable view tool area can be adjusted. If desired, the entire group of selectable components can be presented in a linear view at a given time.

Although the linear scrollable view tool 130 is presented as in a vertical direction in FIG. 4, it should be noted that it can be presented in horizontal direction. The linear scrollable tool may be presented within a Control Pad region 120 as shown in FIG. 4, or presented in the document/composition region 110 where the object is shown. In some embodiments, the linear scrollable view tool 130 may be provided as a floating tool that can be movably placed anywhere within the screen. The scroll gesture can be made directly on the linear scrollable tool or can be made through the Control Pad region 120.

Figure 5A:
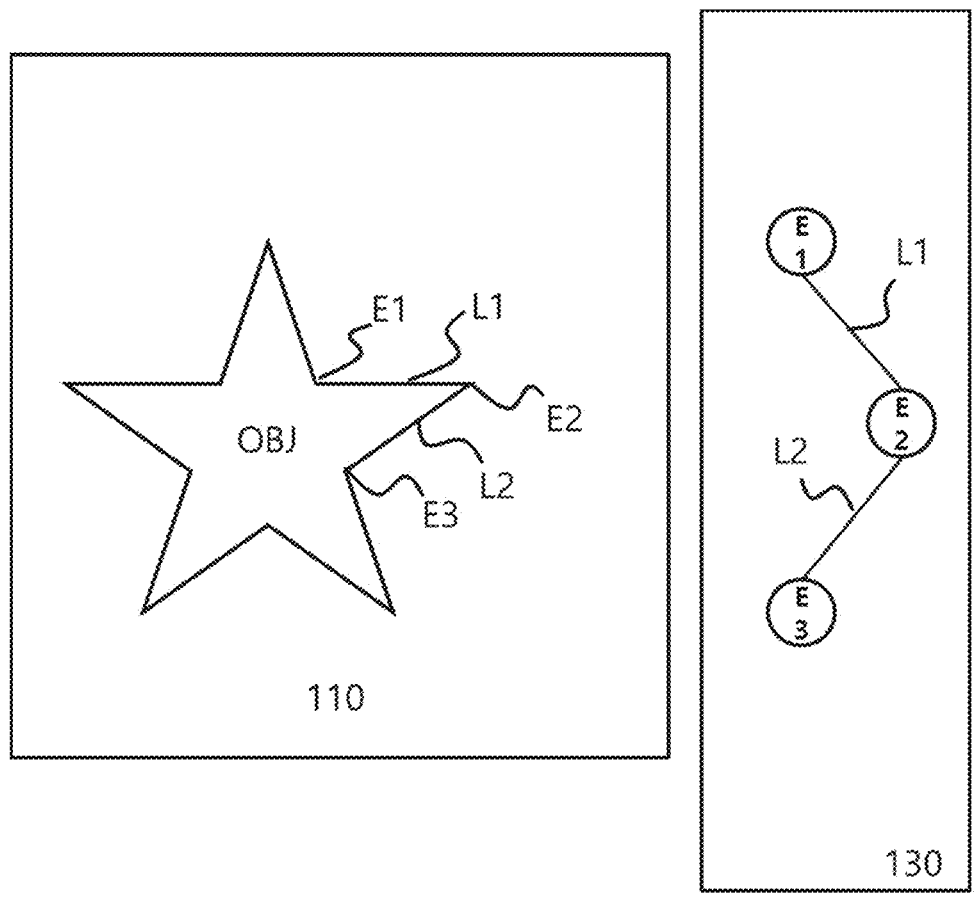
FIGS. 5A and 5B illustrate a user interface provided with an exemplary linear scrollable view tool in accordance with some embodiments.

In some embodiments, the selectable elements and the lines between those selectable elements are not shown is a straight line, but skewed in a direction according to the respective selective elements relative direction/position from the immediately previous/next component within the actual object. In FIG. 5A, the group of selected elements shown in a vertically arranged linear scrollable view tool includes selectable points E1~E3 and selectable lines L1~L2. In the actual object OBJ shown in the composition region 110, the second selectable point E2 is positioned on the right side of the first selectable point E1 (e.g., the x coordinate of E2 is greater than the x coordinate of E1). Accordingly, E2 is positioned slightly on the right side of E1 in the vertical linear scrollable view tool 130, and the selectable line L1 between E1 and E2 are shown as a slanted line. In the actual object OBJ represented in the composition region 110, the third selectable point E3 is positioned on the left side of E2 (e.g., the x coordinate of E3 is smaller than the x coordinate of E2). Accordingly, E3 is positioned slightly on the left side of E2 in the vertical linear scrollable view tool 130, and the selectable line L2 between E2 and E3 is shown as a slanted line extending in an opposite direction from L1.

In some embodiments, the selectable points shown in the linear scrollable view tool 130 are offset proportionally or otherwise displaced from the transverse axis. For example, if the linear scrollable view tool 130 is arranged vertically, the Y axis is the unwound distance of points along the outline, but the X axis cannot be used to represent the distance between the selectable elements, therefore displacement of the selectable element in the X axis direction can be used to indicate the approximate horizontal position of the selectable elements in the composition region, so that the user can more easily identify the selectable elements along the outline. For instance, when represented the linear scrollable view tool 130, the leftmost located element of the object (in the composition region 110) would be mapped to the leftmost side among the group of selectable elements shown in the linear scrollable view tool 130, and the rightmost located element of the object (in the composition region 110) may be positioned in the right side in the linear scrollable view tool 130, with other selectable elements positioned proportionally in between those leftmost positioned element and the rightmost positioned element.

Figure 5B:
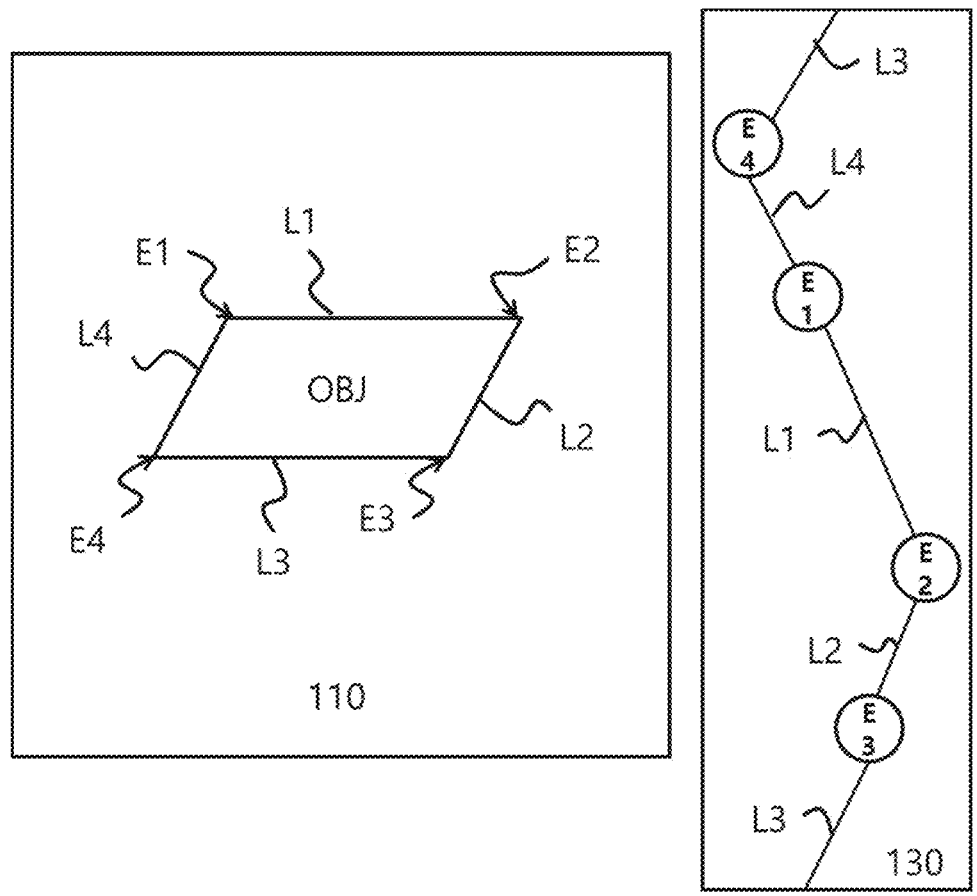

Referring to FIG. 5B, the selectable element (the vertices E1-E4 and the lines L1-L4 in this example) are shown in the composition region 110, and they are represented in the linear scrollable view tool 130. Note that the element E4 is the leftmost positioned selectable element in the composition region 110, and thus it is positioned at the leftmost side in the linear scrollable view tool 130 as well. Likewise, the element E2 is the rightmost positioned selectable element in the composition region 110, and thus it is positioned at the rightmost side in the linear scrollable view tool 130. Element E1 is positioned on the left side of the element E4 and on the right side of the element E2. Their relative position in the composition region 110 is reflected in the linear scrollable view tool 130. Also, the relative lengths of the lines between the two selectable points (in other words, the distance between the two points) in the actual object shown in the composition region 110 is reflected when presenting them in the linear scrollable view tool 130. For instance, the lines L4 and L2 are shorter than the lines L1 and L3 in the object OBJ shown in the composition region 110. Accordingly, the lines L4 and L2 are drawn to be shorter than the lines L1 in the linear scrollable view tool 130.

In some embodiments, the magnitude of the difference in position between the selectable points in the actual object presented in the composition region 110 may not be relevant in representing their relative position in the linear scrollable view tool 130. In other words, the distance between the respective points in the actual object in the composition view 110 has no effect and the offset distance between two selectable points is unchanged in the linear scrollable view tool 130. In such configuration, it is only the relative position of the two selectable points in the actual object, which determines the offset direction in the linear scrollable view tool 130.

In some other embodiments, the relative position of the two immediately ordered selectable points is used in setting the offset direction in the linear scrollable view tool, and offset distance between the selectable points in the linear scrollable view tool 130 is varied by the actual distance between the two respective selectable points in the actual object view. However, in some embodiments, the distances between the selectable points shown in the linear scrollable view tool 130 may all be uniform, ignoring differences in spacing in the original object OBJ.

Figure 6:
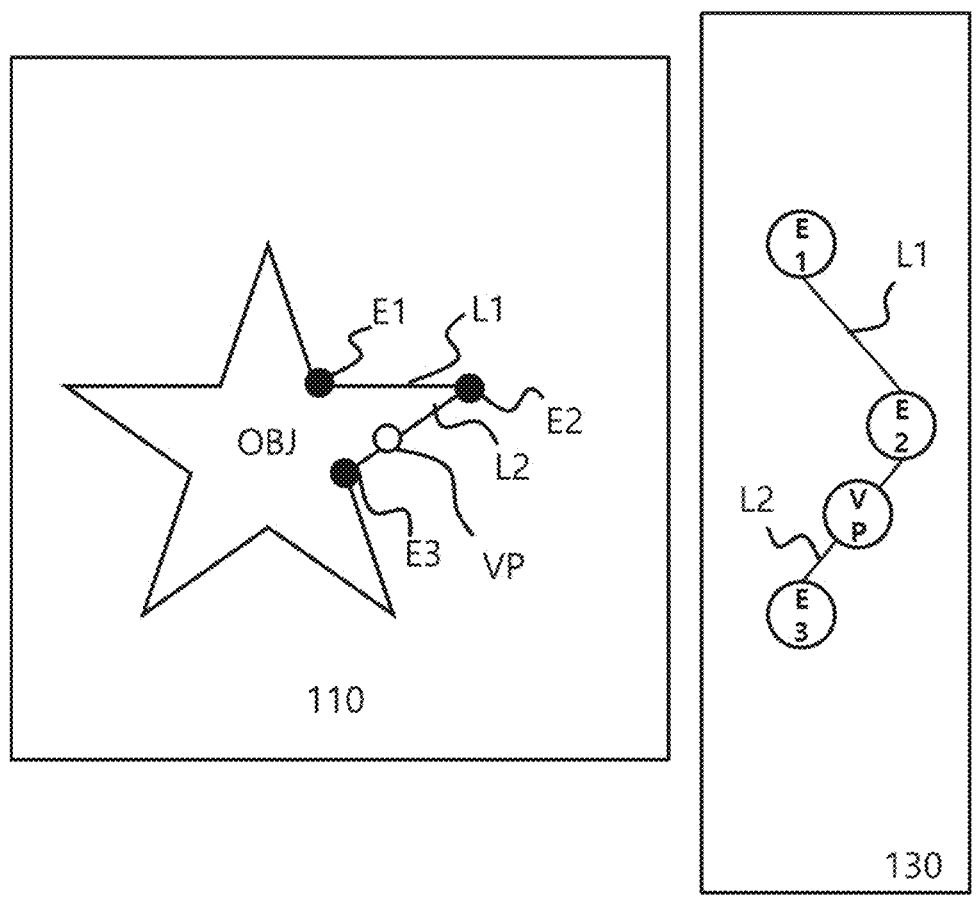
FIG. 6 illustrates a user interface provided with an exemplary linear scrollable view tool, which is provided with a virtual point for creating an element in the object in accordance with some embodiments.

In some embodiments, when the user has scrolled between two selectable points, a virtual point may be presented when the user is scrolling in between two selectable points shown in the linear scrollable view tool 130. Referring to FIG. 6, the position of the virtual point VP along the line between the two selectable points E1 and E2 may be based on the scroll distance registered. A new point may be added at the location of the virtual point VP (or a "ghost point"), either explicitly by selecting a "create new point" (or similar function) option in the user interface, or by using gesture control, for example, tapping on the Control Pad region 120 or giving pressured push on the screen while scrolling on a pressure sense touch screen device. Before actually making that virtual point VP in the actual selectable element in the object OBJ shown in the composition region 110, the virtual point VP can be moved by using the scroll gesture made to the linear scrollable view tool 130 as if it were an actual control point (interacting with the virtual control point in this was causes it to become an actual non-virtual control point upon being manipulated by the user).

Although the features regarding the linear scrollable view tool 130 are described in reference to vertically arranged linear scrollable view tool 130, it should be noted all of the foregoing features can also be implemented in the same fashion for horizontally arranged linear scrollable view tool.

Figure 7:
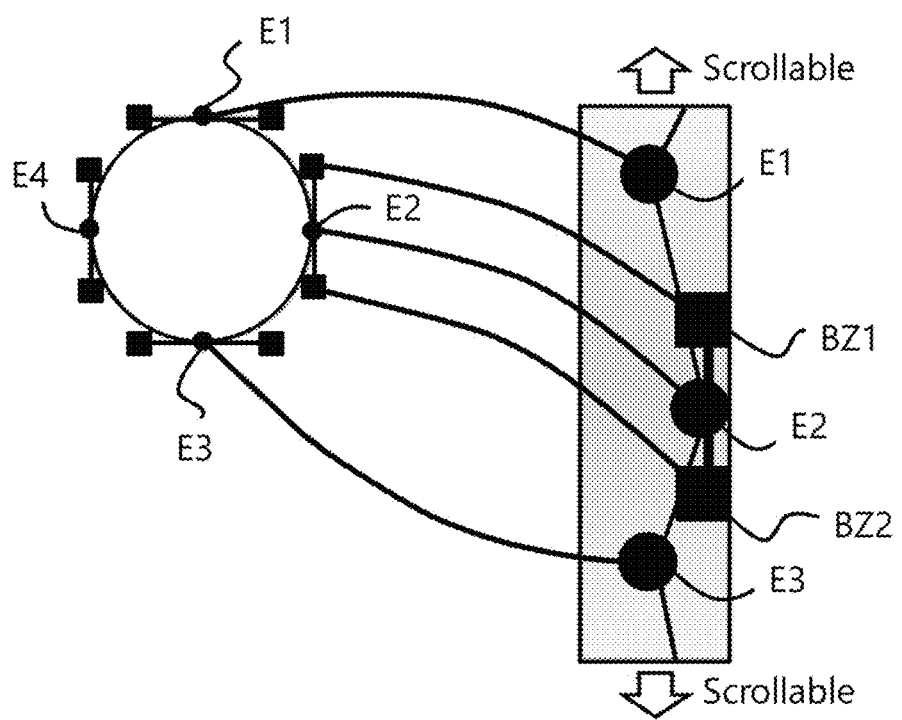
FIG. 7 illustrates a user interface provided with an exemplary linear scrollable view tool, which is provided with a Bezier control handle for manipulating the selected object in accordance with some embodiments.

Referring to FIG. 7, the linear scrollable view tool 130 may be provided with a Bezier control handle BZ1, BZ2 where a curved Bezier outline or a point on a curved Bezier outline is being selected. Optionally, the handles may be shown only when near the main control point for a clearer interface. The user can touch the handles in the linear scrollable view tool to select one of the control handles to manipulate.

Figure 8A:
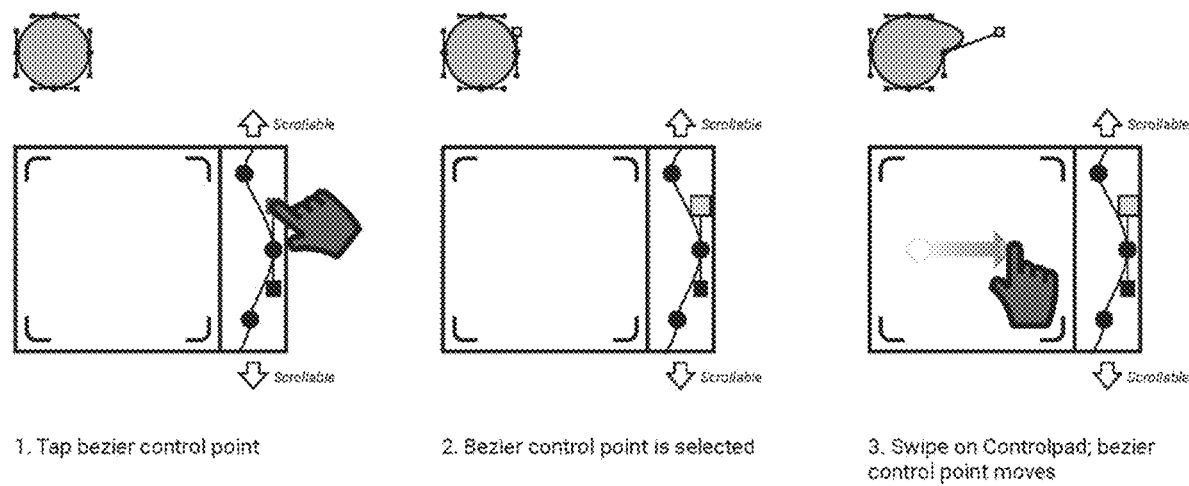
FIGS. 8A to 8C illustrate exemplary user interfaces for manipulating user interface objects in accordance with some embodiments.
Figure 8B:
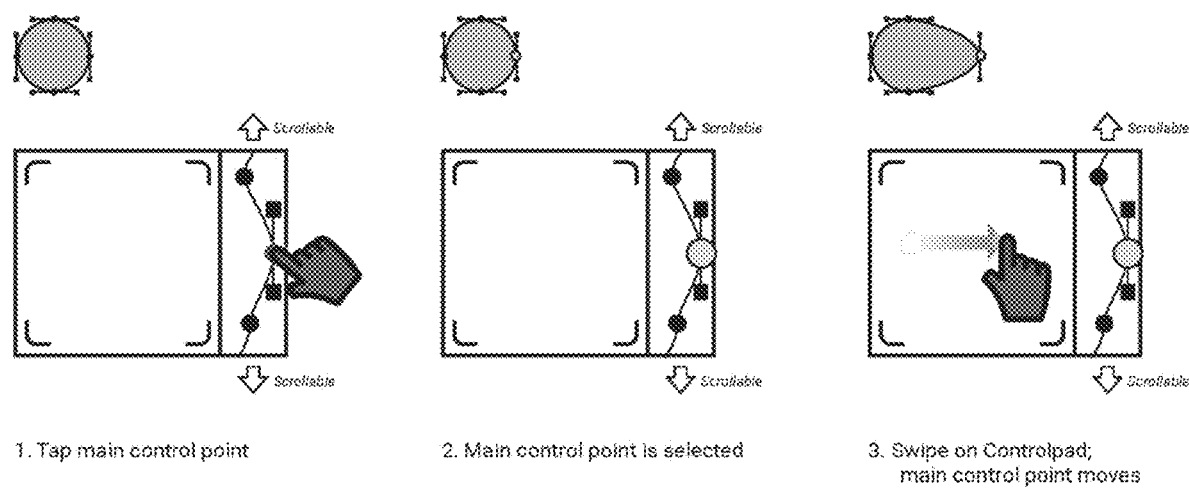
Figure 8C:
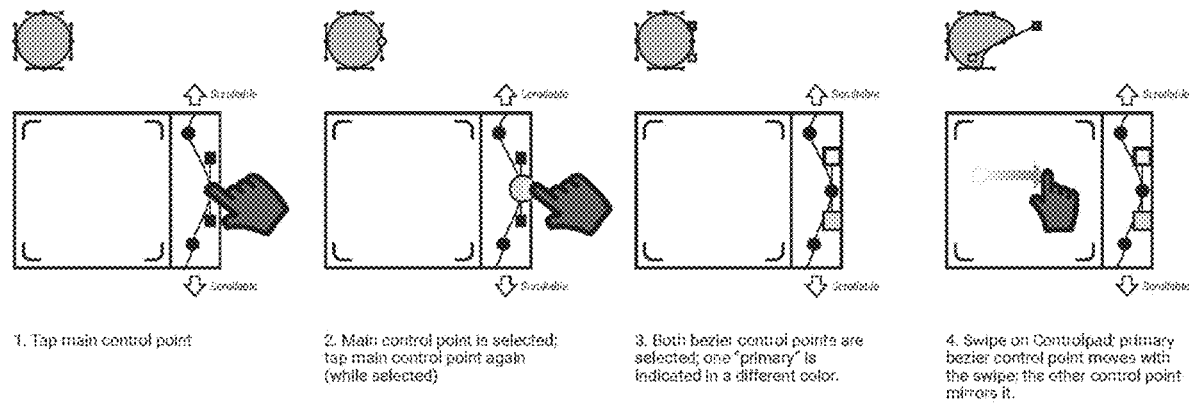

As shown in FIGS. 8A and 8B, touching the main control point between the Bezier handles selects that point for positioning; the point and two associated control handles move together as a single object when the position is manipulated. Touching the main control point between the Bezier handles when it is already selected changes the selection to de-select the main control point and simultaneously select both Bezier control handles. In this mode, the handles can be moved symmetrically, preserving the angle of the curve passing through the control point and the relative distances of the control handles as depicted in FIG. 8C.

There are several conventional methods used in scaling an element. First, a handle can be dragged to scale the element. This method is not suitable for mobile devices as the touch area on the screen by user's finger may be too large and makes it difficult to select the handle. Also, the handle may be off the screen if the element is too big. Another conventional method is the pinch gesture to scale the element. This "pinch to scale" method is not suitable for precise editing because the fingers often obscure the element being edited, and a motion of one pixel on the screen may translate to multiple pixels in the document or composition. Yet another conventional method is by using a slider, which can be dragged to adjust width/height/scale. This method can be difficult to use for precise editing unless the slider is larger (in pixels) than the document/composition being edited, otherwise the same problem as the "pinch to scale" method above is presented.

Figure 9A:
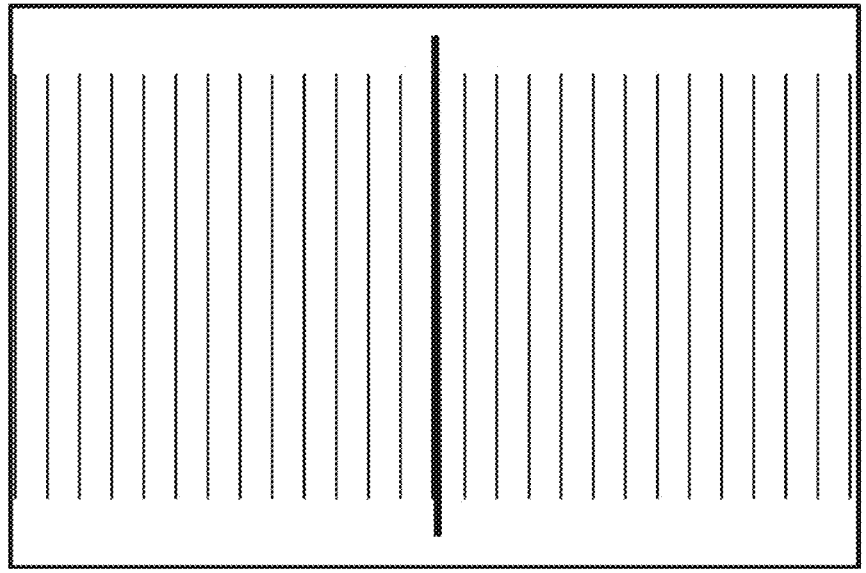
FIGS. 9A and 9B illustrate user interfaces provided with Control Pad, in which exemplary spinner in accordance with some embodiments.

To alleviate the aforementioned problems of the conventional methods, the Control Pad technology of the present disclosure provides a spinner rather than a slider, as it can cover a much larger range. In one embodiment of the invention, the spinner may appear as in FIG. 9A. Here, each line indicates a pixel along the object's largest axis, so swiping left or right shrinks or enlarges the object by one pixel along the largest axis, and proportionally (maintaining the same aspect ratio) along the smaller axis. For example, if an object is 50 pixels high and 100 pixels wide, it is largest along the x-axis, so each marked increment would indicate one pixels along the x-axis, and half of a pixel along the y-axis. The reason for using the largest axis is to allow the user pixel-precise control (if the smaller axis were used, the larger axis would have to scale in increments larger than a pixel to maintain the aspect ratio).

For large changes in scale, the spinner should support fling gestures with momentum, so the user can fling with their finger, then touch the screen to "catch" the fling followed by a drag for fine adjustment.

Figure 9B:
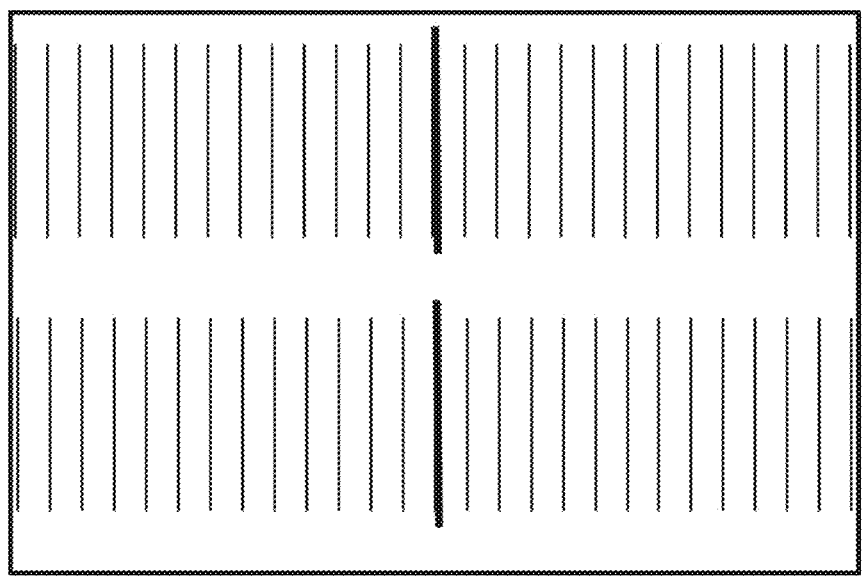

In some embodiments, the spinner may be split into two separate individual sub-spinners as depicted in FIG. 9B, allowing independent adjustment of the X and Y axes, changing the aspect ratio. A button may be provided to split the spinner into two sub-spinners or to merge the two sub-spinners back into a single spinner, after which the new aspect ratio is locked and maintained while operating the spinner.

In various embodiments, the methods and systems may be incorporated as a feature that may be turned on and off by the user.

In accordance with one embodiment of the invention, the computer system is designed to recognize gestures applied to the input device and to control aspects of the computer system based on the gestures. In some cases, a gesture can be defined as a stylized interaction with an input device that can be mapped to one or more specific computing operations. The gestures can be made through various hand, and more particularly finger motions. Alternatively or additionally, the gestures can be made with a stylus. In all of these cases, the input device receives the gestures and the processor executes instructions to carry out operations associated with the gestures. In addition, the memory block can include a gesture operational program, which can be part of the operating system or a separate application. The gestural operation program generally can include a set of instructions that recognizes the occurrence of gestures and informs one or more software agents of the gestures 85 and/or what action(s) to take in response to the gestures. The details regarding the various gestures that can be used as input commands was discussed above.

Normally, computer system interprets touch detection as a normal selection/manipulation command. However, embodiments of the present disclosure may overwrite/substitute such a conventional selection/manipulation operation interpretation (e.g., by defining a new application programming interface [API]) that enables the linear scrollable view tool, motion absorbent snapping feature, or other features of the Control pad technology described above.

Features of the Control pad technology described above can be activated/deactivated by predetermined touch gestures. Features of the Control pad technology can also be deactivated via a button, which may always visible in a predetermined position of the document. Such button can act as a toggle; it activates and de-activates some of the features of the Control pad technology.

A certain delay/time frame may also be interpreted as a tool summoning operation. Stated another way, if a touch input is detected over a selectable element of an object, the system may wait a certain amount of time (e.g., a threshold time of sec., sec., etc.) to determine if the touch input should be interpreted as a command for activating some of the features of the Control pad technology. In some embodiments, features of the Control pad technology can be activated when a detected touch input region encompasses multiple selectable elements of the object shown in the screen.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Application of Technology

It is envisioned that this technology will be applied directly within mobile applications that manipulate complex graphical objects. The technology is applicable to many kinds of applications, including but not limited to graphics editing applications, presentation applications, page layout applications, and so on. However, it is most beneficial in applications where a high level of complexity is typical and precision is important. For example, vector graphics illustration, motion graphics, animation, visual effects, and so on.

The reference case for this application is a motion graphics application that combines animation with vector graphics. In this application, the technology is used in the following areas:

To edit individual control points that define vector shapes.

To edit the position and scale of a vector shape as a whole, or the position and scale of other types of layer in an animation composition (including video, text, and bitmap image layers).

To move the pivot point around which a layer or vector shape is rotated or scaled.

To define the control points along the motion path of a vector shape or layer

To manipulate the control points of a gradient fill effect within a vector shape To adjust the position of focus points for visual effects (for example, focus points for a tilt/shift or blur effect, direction of motion for a path blur effect, and so on).

Hardware/Software Environment

Figure 10:
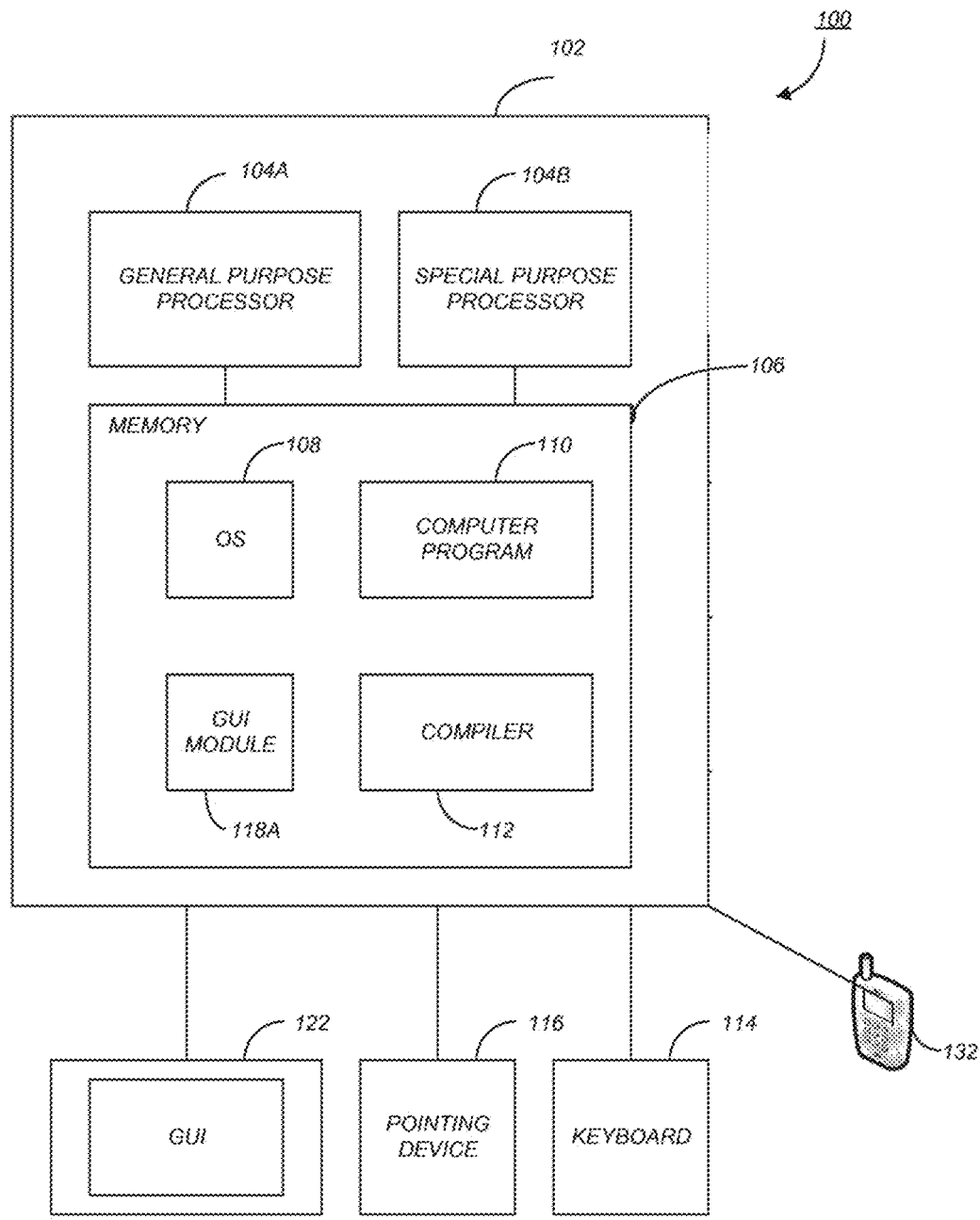
FIG. 10 is an exemplary computing device in which some embodiments of the invention are implemented.

FIG. 10 is an exemplary hardware and graphical user 200 used to implement one or more embodiments of the invention. The hardware and software environment includes a computer 202 and may include peripherals. Computer 202 comprises a general purpose hardware processor 204A and/or a special purpose hardware processor 204B (hereinafter alternatively collectively referred to as processor 204) and a memory 206, such as random access memory (RAM). The computer 202 may be coupled to integrated with other devices, including input/output (I/O) devices such as a touch input/interaction device 216 (e.g., pen). In one or more embodiments, computer 202 may be coupled to or may comprise a portable or media viewing/listening device 232 (e.g., an MP3 player, iPod™, Nook™, portable digital video player, cellular device, personal digital assistant, etc.).

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208 to provide output and results. By way of example, the operating system can correspond to Unix, Linux, iOS, Android, WebOS, Tizen and the like. The operating system can also be a special purpose operating system, such as ones that can be used for limited purpose appliance-type computing devices. The operating system, other computer code and data can reside within a memory block that can be operatively coupled to the processor. Memory block generally provides a place to store computer code and data that can be used by the computer system.

Output/results may be presented on the display 222 or provided to another device for presentation or further processing or action. In one embodiment, the display 222 comprises a liquid crystal display (LCD) having a plurality of separately addressable liquid crystals. Alternatively, the display 222 may comprise an organic (or quantum-dot) light emitting diode (OLED/QLED) display having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors. In one or more embodiments, the display 222 is integrated with/into the computer 202 and comprises a multi-touch device having a touch sensing surface (e.g., track pod or touch screen) with the ability to recognize the presence of two or more points of contact with the surface. Examples of a multi-touch devices include mobile devices (e.g., iPhone™, Pixel™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

A touch sensor can be configured to transfer data from the outside world into the computer. The touch sensor may for example be used to perform tracking and to make selections with respect to the GUI on the display. The touch sensor may also be used to issue commands in the computer. The touch sensor may be configured to receive input from a users touch and to send this information to the processor. In the present disclosure, the touch sensor is a touch screen, which is used instead of a separate/dedicated physical trackpad or mouse. It should be noted that the features described in the present disclosure are aimed at resolving problems in touch-enabled devices where dedicated physical trackpad or mouse which utilizes intermediate graphical pointer (i.e., cursor) is used. In many cases, the touch-sensing device recognizes touches, as well as the position and magnitude of touches on a touch sensitive surface. The touch sensing device detects and reports the touches to the processor and the processor interprets the touches in accordance with its programming. For example, the processor can initiate a task in accordance with a particular touch. A dedicated processor can be used to process touches locally and reduce demand for the main processor of the computer system.

The touch sensor can be based on sensing technologies including but not limited to capacitive sensing, resistive sensing, surface acoustic wave sensing, pressure sensing, optical sensing, and/or the like. Furthermore, the touch sensing means can be based on single point sensing or multipoint sensing. Single point sensing is capable of only distinguishing a single touch, while multipoint sensing can be capable of distinguishing multiple touches that occur at the same time.

As discussed above, the touch sensor can be a touch screen that is positioned over or in front of the display, integrated with the display device, but is not intended to be a separate component, such as a touch pad.

Aspects of the present invention are described herein with reference to methods, apparatus (systems) and computer program products according to embodiments of the invention. It will be understood that each function and internal steps for implementing such functions can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts described in the present document.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the present invention may be embodied as a system, method or computer program product. Accordingly, aspects of the present invention may take the form an entirely software embodiment (including firmware, resident software, microcode, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a random access memory (RAM), a read-only memory (ROM), an erasable programmable read-only memory (EPROM or Flash memory), or any suitable combination of the foregoing. In the context of this document, a computer readable storage medium may be any tangible medium that can contain, or store a program for use by or in connection with an instruction execution system, apparatus, or device.

Having described preferred embodiments for an approach for selecting a desired object on a small touch screen (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

What is claimed is:

1. A method of selecting an element represented on a touch screen display, comprising:
    displaying one or more graphical objects on the touch screen display, where the touch screen display is responsive to a touch input made on the touch screen display;
    activating a linear-scrollable view tool when the touch input is made to select a graphical object, the linear-scrollable view tool showing a group of selectable elements associated with the selected graphical object disseminated in a linear representation;
    alternating the selection among the group of selectable elements while a gesture indicative of scroll is registered on the touch screen display; and
    finalizing the selection with an element being selected at the time when the gesture indicative of scroll is no longer registered on the touch screen.

2. The method of claim 1, wherein the linear scrollable view tool is arranged either horizontally or vertically.

3. The method of claim 1, wherein a number of alterations of selection among the group of selectable elements made by the gesture indicative of scroll is varied based on a distance of touch input movement made on the touch screen display representing the gesture indicative of scroll.

4. The method of claim 1, wherein the gesture indicative of scroll is made on a Control Pad region different from the linear scrollable view tool.

5. The method of claim 1, wherein the group of selectable elements is one of a group of outline control points, a group of Bezier curve control points, a group of lines, a group of motion paths and a group of pivot points associated with the selected graphical object.

6. The method of claim 1, wherein a temporary pointer for adding a new selectable point is presented in the linear scrollable view tool such that a position of the temporary pointer is updated along a linear representation of the group of selectable elements as the gesture indicative of scroll is being registered on the touch screen display, and a new selectable point is created at a then-current position of the temporary pointer upon a touch input indicative of new selectable point creation is registered.

7. The method of claim 6, wherein the group of selectable elements illustrated in the linear scrollable view tool is updated to include the newly created selectable point, and wherein the selected object displayed in the document is also updated to include the newly created selectable point at logical position corresponding to the position of the newly created selectable point represented in the linear scrollable view tool.

8. The method of claim 1, wherein the selection of at least one of selectable elements of a graphical object is made without any graphical cursor.

9. A method of manipulating a selectable element represented on a touch screen display, comprising:
    displaying one or more elements associated with a graphical object on the touch screen display, the touch screen display being responsive to a touch input made on the touch screen display;
    selecting an element from said one or more elements;
    repositioning the selected element in response to a touch gesture indicative of movement of the selected element; and
    when the selected element is repositioned to a coordinate of another element, holding the position of the selected element to said coordinate until a predetermined amount of the touch gesture indicative of movement of the selected element is made in a given direction, wherein the selected element is released and moved away continuously from said coordinate upon more than the predetermined amount of the touch gesture indicative of movement of the selected element is made in a given direction.

10. The method of claim 9, wherein the touch gesture indicative of movement of the selected element is received in the control pad region.

11. The method of claim 9, wherein the predetermined amount of the touch gesture to be ignored until releasing the selected element from the holding coordinate is stored in a lookup table including a touch gesture distance to element movement distance map for the selected element relative to at least one of a plurality of snapping points.

12. The method of claim 11, wherein the lookup table is prepared upon selection of an element.

13. The method of claim 12, wherein the lookup table includes touch gesture distance to element movement distance map for the selected element relative to all of the potential plurality of snapping points.

14. A method of manipulating a selectable element represented on a touch screen display, comprising:
    displaying one or more selectable elements on the touch screen display, where the touch screen display is responsive to a touch input made on the touch screen display;
    selecting an element among said one or more selectable elements;
    repositioning the selected element in response to a touch gesture indicative of movement of the selected element; and
    when the selected element is repositioned to a coordinate of another element, temporarily holding the position of the selected element to said coordinate until a predetermined distance in a given direction is registered via the touch gesture indicative of movement of the selected element, wherein the selected element is released and moved away continuously from said coordinate upon more than the predetermined distance in a given direction is registered via the touch gesture indicative of movement of the selected element.

15. The method of claim 14, wherein an accumulation of distance of movement for the selected element in any given direction is calculated and compared against the predetermined distance for temporarily holding repositioning of the selected element.

16. A non-transitory computer useable storage medium comprising a computer readable program, wherein the computer readable program, when executed on a computer, causes the computer to:
   display a linear scrollable view tool showing a group of selectable elements associated with a graphical object disseminated into a linear arrangement, wherein the group of selectable elements is one of a group of outline control points, a group of bezier curve control points, a group of lines, a group of motion paths and a group of pivot points associated with the selected graphical object.

17. The non-transitory computer usable storage medium of claim 16, wherein the computer readable program is configured to ignore touch gesture indicative of repositioning of a selected element based on a lookup table including a touch gesture distance to element movement distance map for the selected element relative to at least one of a plurality of snapping points.

* * * * *